United States Patent
Wood et al.

(10) Patent No.: US 11,363,529 B2
(45) Date of Patent: Jun. 14, 2022

(54) SOFTWARE EMULATION OF PARALLELIZED PACKET DETECTION ACROSS CHANNELS

(71) Applicant: Silicon Laboratories Inc., Austin, TX (US)

(72) Inventors: Jake G. Wood, Wall, NJ (US); Bryan K. Murawski, Belmont, MA (US); Guner Arslan, Austin, TX (US); Logan A. Lucas, Austin, TX (US); Charles A. Weinberger, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 455 days.

(21) Appl. No.: 16/520,924

(22) Filed: Jul. 24, 2019

(65) Prior Publication Data
US 2021/0029638 A1    Jan. 28, 2021

(51) Int. Cl.
*H04W 52/02*      (2009.01)
*H04B 17/318*     (2015.01)

(52) U.S. Cl.
CPC ...... *H04W 52/0229* (2013.01); *H04B 17/318* (2015.01); *H04W 52/0216* (2013.01)

(58) Field of Classification Search
CPC .......... H04W 52/0229; H04W 52/0216; H04B 17/318; Y02D 30/70
See application file for complete search history.

(56) References Cited

U.S. PATENT DOCUMENTS

| | | | |
|---|---|---|---|
| 7,903,608 B2 | 3/2011 | Gan et al. | |
| 8,331,289 B1* | 12/2012 | Lee | H04B 1/006 370/328 |
| 9,197,467 B2* | 11/2015 | Picard | H04L 27/0012 |
| 2012/0082273 A1* | 4/2012 | Chang | H04B 17/309 375/346 |
| 2019/0363981 A1* | 11/2019 | O'Brien | H04L 45/74 |
| 2020/0402402 A1* | 12/2020 | Howell | G08G 1/149 |

FOREIGN PATENT DOCUMENTS

| | | | | |
|---|---|---|---|---|
| CN | 107852380 A | * | 3/2018 | ........... H04L 1/1854 |
| WO | WO-2017027917 A1 | * | 2/2017 | ............. H04B 1/713 |

* cited by examiner

*Primary Examiner* — Christopher P Grey
(74) *Attorney, Agent, or Firm* — Nields, Lemack & Frame, LLC (57) ABSTRACT

A system and method for detecting and receiving packets that are transmitted over a network that utilizes a plurality of channels is disclosed. The system includes a radio circuit, which can be configured to receive packets over a plurality of channels, a processing unit, and a memory in communication with the processing unit. The processing unit loads a set of operating parameters in the radio circuit, which enables the radio circuit to detect and receive packets on a particular channel. If a preamble is not detected within a predetermined time period, the system hops to a different channel by loading a second set of operating parameters in the radio circuit. This process can be repeated for an arbitrary number of channels.

19 Claims, 4 Drawing Sheets

SOFTWARE EMULATION OF PARALLELIZED PACKET DETECTION ACROSS CHANNELS

FIELD

This disclosure describes systems and methods for emulating parallelized packet detection across a plurality of channels.

BACKGROUND

In most wireless networks, data is communicated between devices using packets of information. In certain embodiments, packets are transmitted from a source to a destination over a network that uses one or more channels. Each packet channel may represent a particular frequency or datarate. For example, certain protocols utilize a frequency hopping algorithm to switch between two or more channels.

In order to receive these packets, the receiving node must be able to monitor the network at each of these channels. This may be accomplished using redundant hardware. For example, a semiconductor receiver may incorporate a plurality of detection circuits, where each detection circuit is configured to monitor a single channel. Each of these detection circuits is in communication with a radio circuit, which is capable of receiving and decoding an incoming packet, based on configuration parameters. In this embodiment, once the detection circuit detects the presence of a packet, the configuration parameters of the radio circuit are switched to that channel so that the packet may be received.

However, while very effective, this approach is expensive in terms of hardware and power consumption. Further, the amount of hardware needed with this approach scales with the number of channels. For example, if the protocol utilizes two channels, there must be two detection circuits. However, if there are four channels, there must be four detection circuits. Thus, the complexity of this approach increases linearly with the number of channels. Furthermore, the power consumption of this approach also scales linearly with the number of channels.

Therefore, it would be beneficial if there were a system and method that could detect packets on a plurality of channels, but did not require additional hardware circuitry to perform this detection. Further, it would be advantageous if this system allows an arbitrary number of channels without an increase in hardware complexity.

SUMMARY

A system and method for detecting and receiving packets that are transmitted over a network that utilizes a plurality of channels is disclosed. The system includes a radio circuit, which can be configured to receive packets over a plurality of channels, a processing unit, and a memory in communication with the processing unit. The processing unit loads a set of operating parameters in the radio circuit, which enables the radio circuit to detect and receive packets on a particular channel. If a preamble is not detected within a predetermined time period, the system hops to a different channel by loading a second set of operating parameters in the radio circuit. This process can be repeated for an arbitrary number of channels.

According to one embodiment, a method of receiving packets on a network that utilizes a plurality of channels is disclosed. The method comprises loading a set of preset and computed values into hardware registers in a radio circuit disposed on a network device, wherein the network device is in communication with the network and the set allows the radio circuit to monitor one channel of the network; monitoring the channel for a transmission; receiving a packet on the channel if a transmission is detected; and if a transmission is not detected within a predetermined period of time, loading a different set of preset and computed values into the hardware registers and repeating the monitoring and receiving steps. In certain embodiments, the predetermined period of time is user selectable. In certain embodiments, the transmission is detected by monitoring the channel for a presence of a preamble pattern. In certain embodiments, the predetermined period of time is determined based on a duration of the preamble pattern and a number of channels in the plurality of channels. In some embodiments, the transmission is detected if a received signal strength indicator (RSSI) exceeds a predetermined threshold. In certain embodiments, the computed values are determined using a computation routine. In some further embodiments, the computation routine is executed at initialization and values computed during the computation routine are stored in a memory device. In some embodiments, the loading comprises copying the preset values and the computed values from locations in a memory device to the hardware registers. In certain embodiments, the preset values and the computed values are stored in the memory device as address-value pairs.

According to another embodiment, a network device is disclosed. The network device comprises a network interface, operable on a network that utilizes a plurality of channels, the network interface comprising a radio circuit having a plurality of hardware registers; a processing unit; a first memory device in communication with the processing unit; and a second memory device; wherein the first memory device comprises instructions, which when executed by the processing unit, enable the network device to: store a plurality of sets of preset values and computed values, one set associated with each of the channels, in the second memory device; load a first of the plurality of sets from the second memory device to the hardware registers; start a timer; monitor a channel on the network for a presence of a transmission; receive a packet on the channel if a transmission is detected; and if a transmission is not detected prior to expiration of the timer, load a different set of preset and computed values into the hardware registers and repeat the monitoring and receiving steps. In certain embodiments, the transmission is detected by monitoring the channel for a presence of a preamble pattern. In some embodiments, the transmission is detected by monitoring a received signal strength indicator (RSSI). In certain embodiments, the computed values are determined using a computation routine. In some further embodiments, the first memory device further comprising instructions that when executed by the processing unit, enable the network device to: store the preset values for each of the plurality of channels in the second memory device; perform the computation routine to determine a first set of computed values; store the first set of computed values in the second memory device; and repeating the load, perform and store steps until values for all channels have been determined. In certain embodiments, the preset values and the computed values are stored in address-value pair format in the second memory device.

According to another embodiments, a software program, disposed on a non-transitory storage media, is disclosed. The software program comprises instructions, which when executed by a processing unit disposed on a network device that is operable on a network that utilizes a plurality of channels, enable the network device to: store a plurality of sets of preset values and computed values, one set associated with each of the channels, in a memory device; load a first of the plurality of sets from the memory device to hardware registers disposed in a radio circuit contained on the network device; start a timer; monitor a channel on a network for a presence of a transmission; receive a packet on the channel if a transmission is detected; and if a transmission is not detected prior to expiration of the timer, load a different set of preset and computed values into the hardware registers and repeat the monitoring and receiving steps. In certain embodiments, the transmission is detected by monitoring the channel for a presence of a preamble pattern. In some embodiments, the transmission is detected by monitoring a received signal strength indicator (RSSI). In certain embodiments, the preset values and the computed values are stored in address-value pair format in the memory device. In some embodiments, the software program further comprises instructions that when executed by the processing unit, enable the network device to: store the preset values for each of the plurality of channels in the memory device; perform a computation routine to determine a first set of computed values; store the first set of computed values in the memory device; and repeating the load, perform and store steps until values for all channels have been determined.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
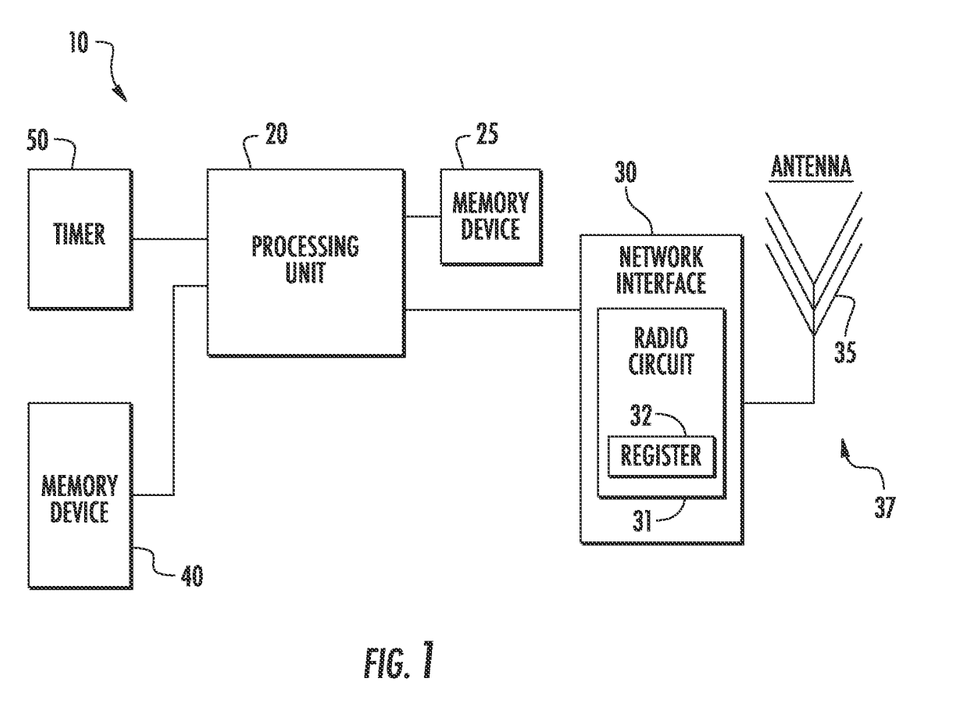
FIG. 1 is a block diagram of a representative network device.

FIG. 1 shows a block diagram of a representative network device 10.

As shown in FIG. 1, the network device 10 has a processing unit 20 and an associated memory device 25. The processing unit 20 may be any suitable component, such as a microprocessor, embedded processor, an application specific circuit, a programmable circuit, a microcontroller, or another similar device. The memory device 25 contains the instructions, which, when executed by the processing unit 20, enable the network device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM. The instructions contained within the memory device 25 may be referred to as a software program, which is disposed on a non-transitory storage media.

The network device 10 also includes a network interface 30, which may be a wireless interface including an antenna 35. The network interface 30 may support any wireless network that utilizes channel hopping, such as Bluetooth LE or wireless smart home protocols, such as Z-Wave. The network interface 30 may also support proprietary protocols. The network interface 30 is used to allow the network device 10 to communicate with other devices disposed on the network 37. The network interface 30 include radio circuit 31. This radio circuit 31 comprises a plurality of hardware registers 32, which are programmed by the processing unit 20. The values loaded into these hardware registers 32 determine the configuration of the radio circuit 31 and determine which channel is being monitored.

The network 37 implements a channel hopping scheme, where packets may be transmitted or received on any of a defined number of channels. A channel is defined as a specific combination of frequency, bit rate, modulation scheme and encoding scheme. In certain embodiments, all channels may utilize the same modulation scheme and encoding scheme. In this embodiment, a channel is defined as a specific combination of frequency and bit rate. More generally, a channel is defined as any combination of one or more parameters that affects the bottom two layers of the OSI network, namely the physical and datalink layers.

Because the network 37 utilizes multiple channels, the network interface 30 must be able to receive packets that are transmitted on any of these channels. In the present system, the network interface 30 comprises a radio circuit 31 that is configured to receive packets on only a single channel at a time. In other words, the radio circuit 31 does not include redundant hardware to allow it to monitor multiple channels simultaneously. Consequently, the present system utilizes time division multiplexing to operate on these multiple channels. In other words, the radio circuit 31 is configured to receive packets on a specific channel for a certain duration of time. After this duration, the radio circuit 31 is then configured to receive packets on a different channel. The radio circuit 31 cycles through all of the channels. This is done by loading new values into the hardware registers 32. In other words, at any given point in time, the network interface 30 is only capable of receiving packets that are being transmitted on one specific channel.

The network device 10 may include a second memory device 40 in which the configuration parameters for the radio circuit 31 are stored, as described in more detail below. This second memory device 40 is traditionally a volatile memory. The processing unit 20 has the ability to read and write the second memory device 40 so as to transfer data from the second memory device 40 to the hardware registers 32 in the radio circuit 31.

Data that is received from the network interface 30 or is to be sent via the network interface 30 may also be stored in the second memory device 40. In other embodiments, the network device 10 may comprise a third memory device (not shown) which stores the data that is to be sent or is received from the network interface 30. Although not shown, the network device 10 also has a power supply, which may be a battery or a connection to a permanent power source, such as a wall outlet.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 1. The second computer readable non-transitory media may be a CDROM, or a different memory device, which is located remote from the network device 10. The instructions contained on this second computer readable non-transitory media may be downloaded onto the memory device 25 to allow execution of the instructions by the network device 10.

The network device 10 may also include one or more timers 50. These timers 50 may be configured by the processing unit 20 and may provide an indication to the processing unit 20 when expired. This indication may be in the form of an interrupt. In other embodiments, the processing unit 20 may poll to determine when the timers 50 have expired.

While the processing unit 20, the memory device 25, the network interface 30, the timer 50 and the second memory device 40 are shown in FIG. 1 as separate components, it is understood that some or all of these components may be integrated into a single electronic component. Rather, FIG. 1 is used to illustrate the functionality of the network device 10, not its physical configuration.

The radio circuit 31 has a plurality of hardware registers 32 that are used to configure the network interface 30. For example, the hardware registers 32 may be used to program the frequency, data rate, bandwidth, modulation scheme, channel spacing, power amplifier settings and other parameters of the network interface 30.

In order for the radio circuit 31 to operate in the network 37 that utilizes channel hopping, there is a unique set of values for the hardware registers 32 for each channel. In other words, if the network 37 utilizes three channels, there are three unique sets of parameters for the hardware registers 32; one for each channel.

Typically, the values that are to be loaded into these hardware registers 32 can be grouped in two categories.

The first set are referred to as preset values. Preset values are specific for a particular channel, but do not vary from one network device to another. These preset values may include most of the non-frequency related parameters, such as data rate, modulation scheme, filter settings, and others. In certain embodiments, these preset values are fixed per channel and are provided as constants to the processing unit 20.

The second category may be referred to as the computed values. Unlike the preset values, which typically have default values that never change, the computed values vary, based on the actual radio circuit 31, the environment in which the network device 10 resides, the proximity of other devices and other parameters. In other words, these computed values are variable and must be calculated for each channel. These computed values may be determined by performing a computation routine which seeks to minimize the error rate, maximize the signal-to-noise ratio, or optimize other parameters. For example, each component may be in communication with one or more crystals, which have a natural frequency. Various calculations must be performed to determine multipliers and dividers that will step that natural frequency up or down to generate the carrier wave or establish the data rate.

In traditional systems, these computed values are calculated each time a set of preset values is loaded into the hardware registers 32. In other words, when a new channel is selected, a computation routine is executed to determine each of the computed values for that channel.

Figure 2:
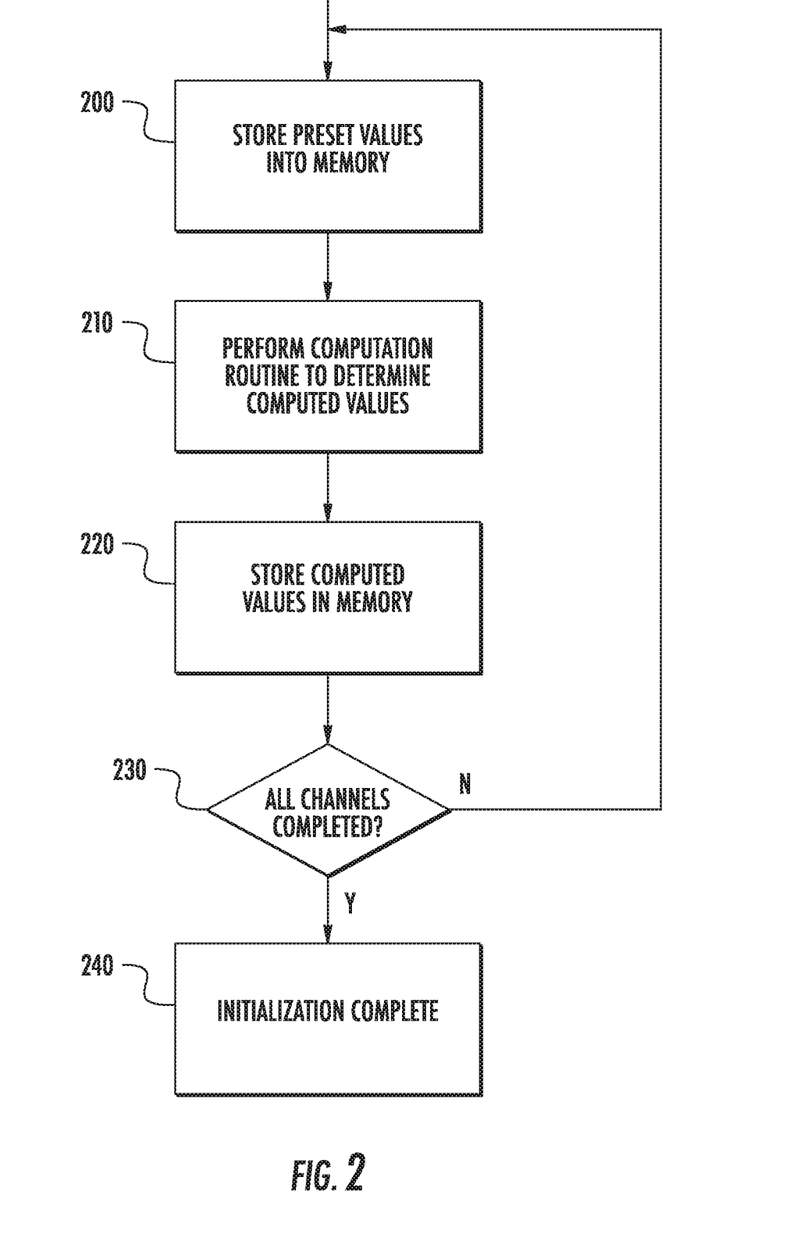
FIG. 2 is a representative flowchart showing the initialization process.

In the present device, a novel approach is used. Specifically, at power up, or at initialization, the processing unit 20 performs the computation routine for all of the channels. FIG. 2 shows a flow chart showing this initialization process. First, as shown in Process 200, the preset values for all of the channels are stored into the second memory device 40.

Figure 3:
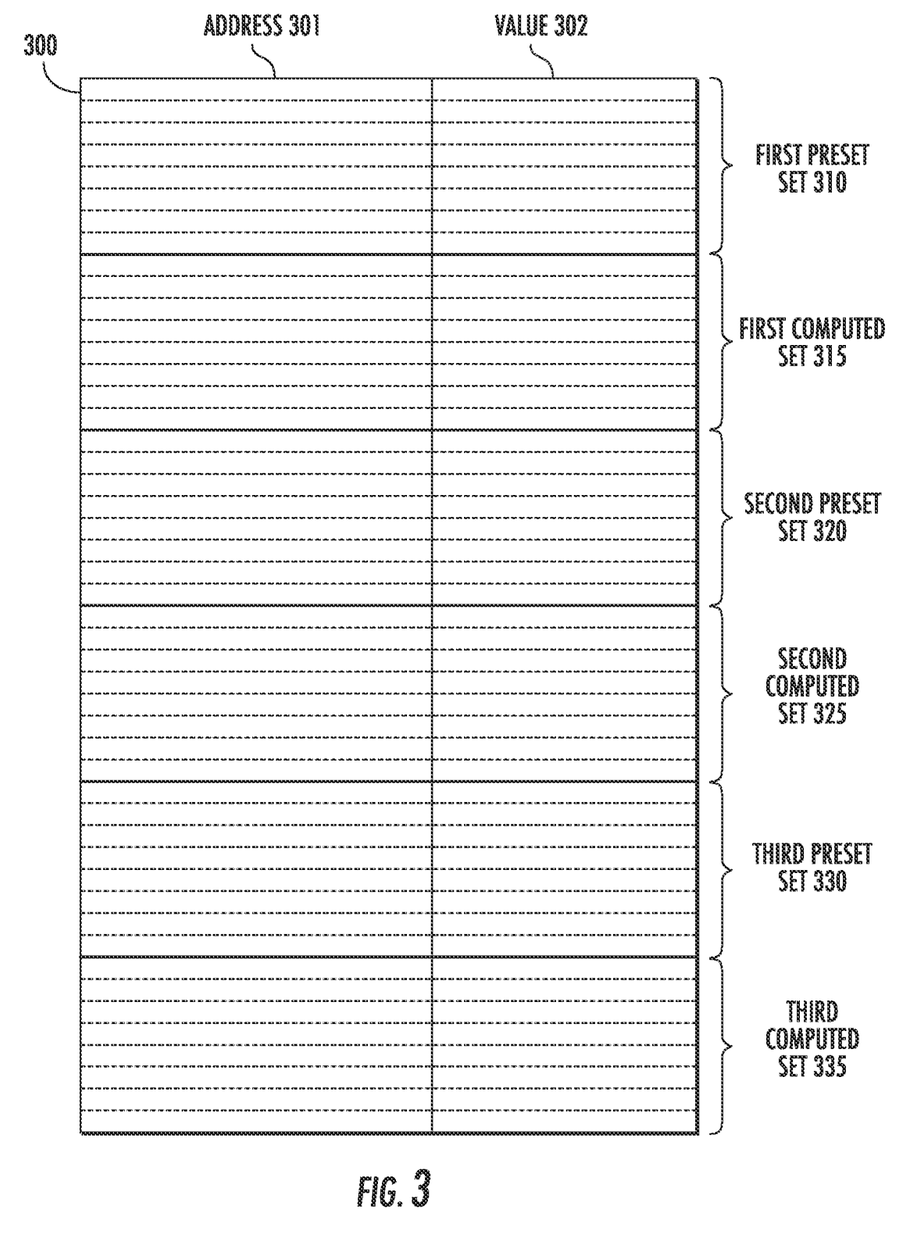
FIG. 3 is a representative drawing showing the organization of the memory device according to one embodiment.

One possible arrangement of the preset and computed values is shown in FIG. 3. In certain embodiments, each preset value is stored as an address-value pair 300. In other words, the preset values are arranged in the second memory device 40 so that the processing unit 20 loads the value 302 stored in the address-value pair 300 in the register indicated by the address 301 in the address-value pair 300. All of the preset values for a particular channel may be grouped together as a preset set. FIG. 3 shows three preset sets; first preset set 310, second preset set 320 and third preset set 330.

After all of the preset values have been stored in the second memory device 40, the processing unit 20 then executes a computation routine, as shown in Process 210. This computation routine allows the processing unit 20 to configure device specific aspects of the radio circuit 31. This computation routine may be very time consuming. For example, in one test, the computation routine consumes more than 100 μsec for each channel. When the computation routine is complete, the processing unit 20 then saves all of the computed values in the second memory device 40, as shown in Process 220. These values may be stored as the first computed set 315. In one embodiment, these computed values are also stored as address-value pairs.

The processing unit 20 then checks if there are additional channels that need to be initialized, as shown in Process 230. If there are, the processing unit 20 repeats Process 210 by executing the computation routine. Once the computation routine is complete, the processing unit 20 stores the computed values in the second computed set 325, as shown in Process 220.

This process repeats until all channels have been initialized. After the computed values have been determined for all channels, initialization is complete, as shown in Process 240. At this point, the preset values and the computed values for each channel have been stored in the second memory device 40. In FIG. 3, three preset sets 310, 320, 330 and three computed sets 315, 325, 335 are illustrated. However, the disclosure is not limited to this embodiment. An arbitrary number of channels may be utilized with the system and method described herein.

Because the computed values are determined during an initialization process, switching between channels is now much quicker. Consequently, channel hopping is accelerated.

Figure 4:
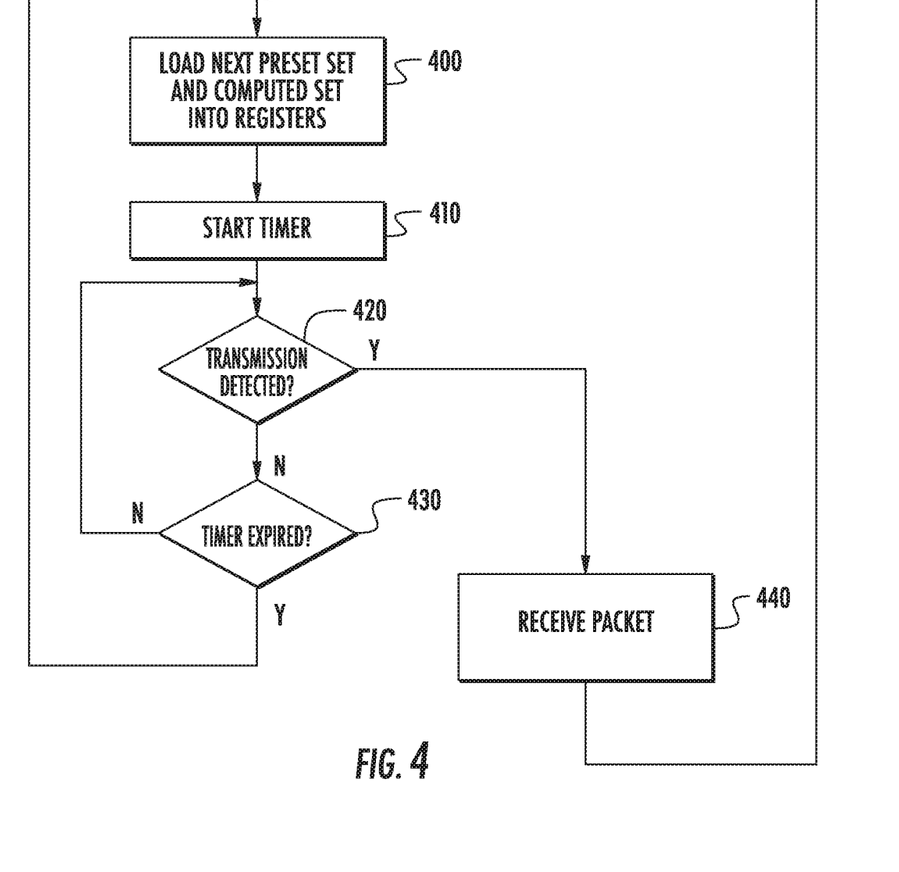
FIG. 4 is a representative flowchart showing the operation of the device according to one embodiment.

FIG. 4 shows a flowchart illustrating how the network device 10 performs channel hopping. First, as shown in Process 400, the processing unit 20 loads a set of preset values and computed values into the hardware registers 32 of the radio circuit 31. As described above, the preset values and the computed values may be stored in the second memory device 40 in address-value pair format. Once the values are all loaded, the radio circuit 31 is able to monitor activity on that particular channel of the network 37.

The processing unit 20 then starts a timer 50, as shown in Process 410. This timer 50 is the amount of time that the network device 10 will remain at this channel before hopping to the next channel. Of course, if a packet is detected, the network device 10 remains on the channel until the packet is received. The value of the timer 50 may be user specified. In certain embodiments, the value of the timer 50 is related to the duration of the preamble and the number of channels. For example, the time required for the network device 10 to cycle through all of the channels is given by:

Period=$\Sigma_{i=1}^{C}(L_i+T_i)$, where C is the number of channels, $L_i$ is the time required to load the preset and computed values for channel i and $T_i$ is the value of the timer for channel i.

If the duration of the preamble is longer than the period, as defined above, the network device 10 is guaranteed to see a preamble, regardless of which channel it is transmitted on. Thus, the value loaded into the timer 50 may be calculated using the above equation. For example, assuming that the time to load the preset and computed values is roughly the same for each channel and defined as L, the value of the timer 50 may be selected such that T<((preamble duration)/C-L). Alternatively, channel times may be determined empirically through testing, to account for factors such as intrinsic radio noise floors that are not accounted for in the above equation.

The radio circuit 31 monitors the network 37 to determine whether a transmission has been detected, as shown in Process 420. A transmission can be detected in several ways. In certain embodiments, the radio circuit 31 determines whether a preamble pattern is detected on the network 37. The radio circuit 31 may include a preamble detector, which compares the data being received from network 37 to a known preamble pattern. In other words, once the radio circuit 31 detects a pattern on the network 37 that matches the preamble pattern, an assumption is made that a packet is about to be transmitted. In another embodiment, the radio circuit 31 waits until it observes the Start of Frame (SOF) to determine that a transmission is being sent. In yet another embodiment, if the RSSI (received signal strength indicator) is above a predetermined threshold, this may be treated as the detection of a transmission.

If a transmission is detected, the radio circuit 31 then switches from hopping mode to receiving mode, where it receives the incoming packet, as shown in Process 440. In other words, once a transmission is detected, the processing unit 20 no longer monitors the timer 50. When the packet is received (either correctly or in error), the processing unit 20 returns to Process 400, where it loads the preset and computed values for the next channel.

If a transmission is not detected, the network device 10 checks if the timer 50 has expired, as shown in Process 430. If the timer has not expired, the network device 10 continues to wait for the detection of a transmission on the selected channel.

If, on the other hand, the timer 50 has expired and a transmission has not been detected, the processing unit 20 loads the next set of preset values and computed values, as shown in Process 400.

Figure 5:
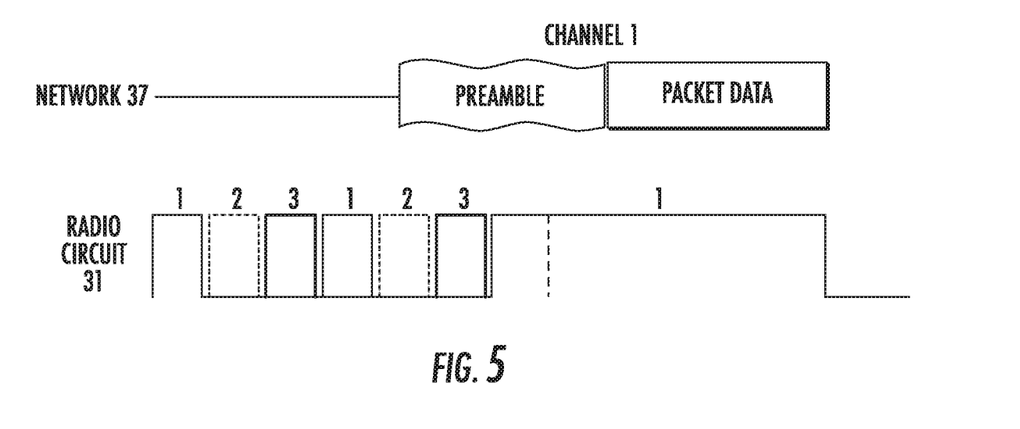
FIG. 5 is a timing diagram showing the operation of the device.

FIG. 5 shows a timing diagram that illustrates the operation of the network device 10. The traffic on network 37 is shown in the top line, while the state of the radio circuit 31 is shown in the bottom line.

At first, there is no traffic on the network 37. The hardware registers 32 of the radio circuit 31 are loaded with the first set of preset and computed values such that the radio circuit 31 is able to monitor channel 1. Since there is no traffic on the network 37, the timer 50 expires. After the expiration of the timer 50, the second set of preset and computed values are loaded into the radio circuit 31. Note that while the hardware registers 32 are being loaded, the radio circuit 31 is not able to monitor the network 37. Thus, there is a gap between the time that the radio circuit 31 stops monitoring channel 1 and the time that the radio circuit 31 begins monitoring channel 2. In one test, it was found that this gap was about 60 μsec.

Stated differently, the time that is required to load all of the preset values and computed values creates a gap in time during which the network device 10 is not monitoring the network. The use of stored computed values, as described with respect to FIG. 2, minimizes the duration of this gap.

After the new set of preset and computed values have been loaded, the radio circuit 31 monitors channel 2. Again, there is no traffic on the network 37, so the timer 50 expires and the processing unit 20 loads the next set of preset and computed values so that channel 3 may be monitored. Again, as described above, there is a gap in time between when the network device 10 stops monitoring channel 2 and starts monitoring channel 3.

This sequence repeats again, as after the timer 50 expires, the radio circuit 31 is reprogrammed to monitor channel 1. After the timer 50 expires again, the processing unit 20 loads the preset and computed values for channel 2 into the hardware registers 32. Note that during this time period, a preamble is being transmitted on the network 37. However, this preamble is being transmitted over channel 1. Thus, the radio circuit 31 is unable to detect its presence. The timer 50 expires again, and the preset and computed values for channel 3 are loaded. Again, a preamble is being transmitted on the network 37 during this time, but is being transmitted over channel 1. Thus, the radio circuit 31 is still unable to detect this transmission.

The timer 50 again expires and the preset and computed values for channel 1 are loaded. At this point, the radio circuit 31 is able to detect the preamble being transmitted over the network 37. Thus, rather than hopping to the next channel after the timer 50 expires, the radio circuit 31 stays on channel 1 to receive the incoming packet.

The system and method described herein has many advantages. First, the present system achieves very low packet error rates. In certain embodiments, depending on the selection of the timer value, the packet error rate may be less than 1%. Additionally, this system employs much less hardware and has much lower power consumption than alternative approaches. For example, in traditional systems, at least a portion of the radio circuit 31 is replicated within the network device 10 to allow simultaneous monitoring of multiple channels. This replication consumes valuable silicon area. Additionally, this replication consumes power, as all of these portions are operating concurrently. In one test, it was found that the receiver section of the present system consumes 2.5 times less power than a system that utilizes redundant radio circuits.

Additionally, the execution of the computation routine prior to normal operating mode is extremely beneficial. For example, in one test, it was found that the computation routine for each channel consumed about 140 μsec and the time required to load all of the hardware registers 32 was about 60 μsec. A calculation can be made of the useful operation ratio of two scenarios. The first scenario is that described herein, where the computation routine is performed at initialization. The second scenario is the typical operation, where the computation routine is performed each time the new set of preset values are loaded. Useful operation is defined is the amount of time that the device is actively monitoring a channel. Useful operation ratio is defined as the useful operation divided by the total time. Thus, for the first scenario, which is the present system, the operating time is equal to the timer value, which may be 270 μsec in some embodiments. The total time is defined as the timer value plus the time needed to load all of the hardware registers 32, or 60 μsec. Thus, the useful operation ratio is 270/(270+60), or 82%. In the second scenario, the operating time is again equal to the timer value, which may be 270 μsec in some embodiments. However, the time to perform the computation routine and load the hardware registers 32 may be about 200 μsec (i.e. 140 μsec for computation routine and 60 μsec for loading). Thus, the useful operation ratio is given by 270/(270+200) or only 58%. Thus, the performance of the computation routines prior to normal operation increased the useful operation by more than 20%!

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of receiving packets on a network that utilizes a plurality of channels, the method comprising:
    loading a set of preset and computed values into hardware registers in a radio circuit disposed on a network device, wherein the network device is in communication with the network and the set allows the radio circuit to monitor one channel of the network;
    monitoring the channel for a transmission;
    receiving a packet on the channel if a transmission is detected, wherein the packet comprises a preamble pattern; and
    if a transmission is not detected within a predetermined period of time, wherein the predetermined period of time is based on a duration of the preamble pattern and a number of channels in the plurality of channels, loading a different set of preset and computed values into the hardware registers and repeating the monitoring and receiving steps.

2. The method of claim 1, wherein the predetermined period of time is user selectable.

3. The method of claim 1, wherein the transmission is detected by monitoring the channel for a presence of the preamble pattern.

4. The method of claim 1, wherein the transmission is detected if a received signal strength indicator (RSSI) exceeds a predetermined threshold.

5. The method of claim 1, wherein the computed values are determined using a computation routine.

6. The method of claim 5, wherein the computation routine is executed at initialization and values computed during the computation routine are stored in a memory device.

7. The method of claim 1, wherein the loading comprises copying the preset values and the computed values from locations in a memory device to the hardware registers.

8. The method of claim 7, wherein the preset values and the computed values are stored in the memory device as address-value pairs.

9. A network device, comprising:
    a network interface, operable on a network that utilizes a plurality of channels, the network interface comprising a radio circuit having a plurality of hardware registers;
    a processing unit;
    a first memory device in communication with the processing unit; and
    a second memory device;
    wherein the first memory device comprises instructions, which when executed by the processing unit, enable the network device to:
    store a plurality of sets of preset values and computed values, one set associated with each of the channels, in the second memory device;
    load a first of the plurality of sets from the second memory device to the hardware registers;
    load a predetermined value into a timer, wherein the predetermined value is based on a duration of a preamble pattern and a number of channels in the plurality of channels;
    start the timer;
    monitor a channel on the network for a presence of a transmission;
    receive a packet on the channel if a transmission is detected, wherein the packet comprises the preamble pattern; and
    if a transmission is not detected prior to expiration of the timer, load a different set of preset and computed values into the hardware registers and repeat the monitoring and receiving steps.

10. The network device of claim 9, wherein the transmission is detected by monitoring the channel for the presence of a preamble pattern.

11. The network device of claim 9, wherein the transmission is detected by monitoring a received signal strength indicator (RSSI).

12. The network device of claim 9, wherein the computed values are determined using a computation routine.

13. The network device of claim 12, wherein the first memory device further comprising instructions that when executed by the processing unit, enable the network device to:
    store the preset values for each of the plurality of channels in the second memory device;
    perform the computation routine to determine a first set of computed values;
    store the first set of computed values in the second memory device; and
    repeating the load, perform and store steps until values for all channels have been determined.

14. The network device of claim 9, wherein the preset values and the computed values are stored in address-value pair format in the second memory device.

15. A non-transitory storage media, comprising instructions, which when executed by a processing unit disposed on a network device that is operable on a network that utilizes a plurality of channels, enable the network device to:
    store a plurality of sets of preset values and computed values, one set associated with each of the channels, in a memory device;
    load a first of the plurality of sets from the memory device to hardware registers disposed in a radio circuit contained on the network device;
    load a predetermined value into a timer, wherein the predetermined value is based on a duration of a preamble pattern and a number of channels in the plurality of channels;

start the timer;

monitor a channel on a network for a presence of a transmission;

receive a packet on the channel if a transmission is detected, wherein the packet comprises the preamble pattern; and if a transmission is not detected prior to expiration of the timer, load a different set of preset and computed values into the hardware registers and repeat the monitoring and receiving steps.

16. The non-transitory storage media of claim 15, wherein the transmission is detected by monitoring the channel for a presence of a preamble pattern.

17. The non-transitory storage media of claim 15, wherein the transmission is detected by monitoring a received signal strength indicator (RSSI).

18. The non-transitory storage media of claim 15, wherein the preset values and the computed values are stored in address-value pair format in the memory device.

19. The non-transitory storage media of claim 15, wherein the further comprising instructions that when executed by the processing unit, enable the network device to:

store the preset values for each of the plurality of channels in the memory device;

perform a computation routine to determine a first set of computed values;

store the first set of computed values in the memory device; and repeating the load, perform and store steps until values for all channels have been determined.

* * * * *